(12) United States Patent
Fraser et al.

(10) Patent No.: US 7,434,282 B2
(45) Date of Patent: Oct. 14, 2008

(54) CELLULAR CUSHIONS AND METHODS OF FABRICATING

(75) Inventors: Kevin Gerard Fraser, Belleville, IL (US); Winfield Russell Matsler, Belleville, IL (US)

(73) Assignee: Star Cushion Products, Inc., Freeburg, IL (US)

( * ) Notice: Subject to any disclaimer, the term of this patent is extended or adjusted under 35 U.S.C. 154(b) by 0 days.

(21) Appl. No.: 10/448,290

(22) Filed: May 29, 2003

(65) Prior Publication Data
US 2004/0237201 A1  Dec. 2, 2004

(51) Int. Cl.
A47C 20/02 (2006.01)
A47C 27/08 (2006.01)

(52) U.S. Cl. .......................................... 5/654; 5/655.3

(58) Field of Classification Search ..................... 5/653, 5/654, 655.3, 710–712, 713, 944; 297/452.41
See application file for complete search history.

(56) References Cited

U.S. PATENT DOCUMENTS

| | | | |
|---|---|---|---|
| 3,192,540 A * | 7/1965 | Swank | 5/655.3 |
| 3,192,541 A * | 7/1965 | Moore | 297/284.3 |
| 3,605,145 A * | 9/1971 | Graebe | 5/655.3 |
| 4,005,236 A * | 1/1977 | Graebe | 5/710 |
| 4,541,136 A * | 9/1985 | Graebe | 5/655.3 |
| 4,698,864 A * | 10/1987 | Graebe | 5/654 |
| 4,727,878 A | 3/1988 | Levine | |
| 4,819,286 A | 4/1989 | Beauchamp | |
| 4,912,788 A | 4/1990 | Lonardo | |
| 4,930,171 A | 6/1990 | Frantz | |
| 4,962,553 A | 10/1990 | Marquis | |
| 4,989,284 A | 2/1991 | Gamm | |
| 5,044,030 A * | 9/1991 | Balaton | 5/710 |
| 5,052,068 A * | 10/1991 | Graebe | 5/654 |
| 5,111,544 A | 5/1992 | Graebe | |
| 5,152,023 A * | 10/1992 | Graebe | 5/655.3 |
| 5,163,196 A * | 11/1992 | Graebe et al. | 5/654 |
| 5,304,271 A * | 4/1994 | Gusakov | 156/145 |
| 5,364,162 A | 11/1994 | Bar et al. | |
| 5,369,828 A | 12/1994 | Graebe | |
| 5,395,162 A | 3/1995 | Jay et al. | |
| 5,412,822 A | 5/1995 | Kelly | |
| 5,461,741 A | 10/1995 | Graebe | |
| 5,502,855 A * | 4/1996 | Graebe | 5/654 |
| 5,533,220 A * | 7/1996 | Sebag et al. | 5/654 |
| 5,551,107 A | 9/1996 | Graebe | |
| 5,556,168 A | 9/1996 | Dinsmoor, III et al. | |
| 5,613,257 A | 3/1997 | Graebe | |
| 5,638,565 A * | 6/1997 | Pekar | 5/710 |
| 5,640,728 A * | 6/1997 | Graebe | 5/658 |
| D386,035 S | 11/1997 | Matsler et al. | |

(Continued)

Primary Examiner—Michael Safavi
(74) Attorney, Agent, or Firm—Armstrong Teasdale LLP

(57) ABSTRACT

A cellular cushion includes a base, a plurality of hollow cells, and a sealing layer. The base includes at least a first layer and a second layer. The plurality of hollow cells are coupled to the base and extend outwardly from the base. Moreover, the plurality of cells are coupled together in flow communication. The sealing layer is coupled to at least one of the base first and second layers. At least one of the sealing layer and the base defines a plurality of lock pockets, wherein each of the lock pockets is positioned between adjacent hollow cells for selectively controlling flow communication independently to each of the plurality of hollow cells within the cellular cushion.

38 Claims, 5 Drawing Sheets

U.S. PATENT DOCUMENTS

| | | | |
|---|---|---|---|
| 5,689,845 A * | 11/1997 | Sobieralski | 5/654 |
| 5,836,654 A | 11/1998 | DeBellis et al. | |
| 5,839,140 A | 11/1998 | Wilkerson | |
| 5,845,352 A | 12/1998 | Matsler et al. | |
| 5,857,749 A | 1/1999 | DeBellis et al. | |
| D407,353 S | 3/1999 | Bar et al. | |
| D408,767 S | 4/1999 | Bar et al. | |
| D412,685 S | 8/1999 | Bar et al. | |
| D413,085 S | 8/1999 | Bar et al. | |
| D413,841 S | 9/1999 | Bar et al. | |
| D415,567 S | 10/1999 | Bar | |
| D415,834 S | 10/1999 | Bar | |
| D416,326 S | 11/1999 | Bar | |
| 6,018,832 A | 2/2000 | Graebe | |
| 6,092,249 A | 7/2000 | Kamen et al. | |
| 6,095,611 A | 8/2000 | Bar et al. | |
| 6,134,970 A | 10/2000 | Kumakawa et al. | |
| 6,161,238 A | 12/2000 | Graebe | |
| 6,165,142 A | 12/2000 | Bar | |
| 6,186,594 B1 | 2/2001 | Valiquette et al. | |
| 6,189,168 B1 * | 2/2001 | Graebe | 5/655.3 |
| D439,098 S | 3/2001 | Matsler et al. | |
| 6,230,351 B1 | 5/2001 | Kohnle | |
| 6,415,467 B1 * | 7/2002 | Bretvin | 5/710 |
| D463,701 S | 10/2002 | Borcherding et al. | |
| 6,487,738 B1 | 12/2002 | Graebe | |
| 6,623,080 B2 * | 9/2003 | Clapper | 297/452.41 |
| 6,687,936 B2 * | 2/2004 | Graebe et al. | 5/710 |
| 6,715,174 B2 * | 4/2004 | Tsai | 5/710 |
| 2003/0192125 A1 * | 10/2003 | Graebe et al. | 5/710 |

* cited by examiner

CELLULAR CUSHIONS AND METHODS OF FABRICATING

BACKGROUND OF THE INVENTION

This invention relates generally to cellular cushions, and more particularly, to methods and apparatus for fabricating cellular cushions.

Individuals who are confined to wheelchairs may run the risk of tissue breakdown and the development of pressure sores, which are extremely dangerous and difficult to cure. More specifically, as such individuals are primarily in a seated position for extended periods of time, their weight may be concentrated in the bonier portions of the individual's buttocks. Over time, blood flow to such areas may decrease, causing tissue to break down in these areas.

To facilitate reducing the weight concentration of such individuals, at least some users seated in at least some known wheelchairs use cellular cushions facilitate distributing the individual's weight over a larger area and across the individual's buttocks, and to facilitate decreasing their weight concentration in smaller areas. At least some known cellular cushions include a plurality of hollow fluid-filled cells which project upwardly from a common base. More specifically, because the plurality of air-filled cells are coupled in flow communication through the base, the air within such cells is at the same pressure throughout the plurality of cells, and as such, each cell exerts the same pressure against an individual's buttocks.

However, although such cushions do facilitate distributing the weight across the individuals buttocks, the plurality of cells provide less stability to the seated individual in comparison to a substantially planar seating surface. To facilitate increasing the stability of the user, at least some known cellular cushions are divided into isolated zones of cells, wherein the cells of each zone are only in flow communication with the cells within their zone. By varying the pressure between the isolated zones, the user may be able to increase their stability on the cellular cushion depending on the physical condition of the user. More specifically, the isolated zones may provide only slightly more stability to those users that lack muscular strength in their pelvis and/or thigh regions. Furthermore, such cellular cushions may not provide any additional stability to users that have a skeletal deformity, such as a pelvic obliquity. More specifically, within at least some known zoned cushions, such cushions may bottom out to provide little or no cushioning to a user having a skeletal deformity.

BRIEF SUMMARY OF THE INVENTION

In one aspect, a cellular cushion is provided. The cellular cushion includes a base, a plurality of hollow cells, and a sealing layer. The base includes at least a first layer and a second layer. The plurality of hollow cells are coupled to the base and extend outwardly from the base. Moreover, the plurality of cells are coupled together in flow communication. The sealing layer is coupled to at least one of the base first and second layers. At least one of the sealing layer and the base defines a plurality of lock pockets, wherein each of the lock pockets is positioned between adjacent hollow cells for selectively controlling flow communication independently to each of the plurality of hollow cells within the cellular cushion.

In another aspect, a cellular cushion is provided that includes a base, a plurality of hollow fluid-containing cells, and a manifold. The base includes at least one layer. The plurality of hollow fluid-containing cells are coupled to the base and extend outwardly from the base. A cavity defined within each cell is coupled in flow communication with every other cell cavity. The manifold is coupled to the base, and at least one of the manifold and the base also includes a plurality of fluid control devices. Each of the plurality of fluid control devices is positioned between adjacent hollow fluid-containing cells for selectively controlling flow communication between the plurality of cells such that a fluid pressure within each of the cell cavities is independently controlled by the lock pockets.

In another aspect, a method of fabricating a cellular cushion is provided. The method includes forming a first base layer including a plurality of hollow cells that extend outward from the base and are each coupled together in flow communication, and coupling a second layer to the first layer. The method also includes coupling a third layer to at least one of the first layer and the second layer wherein at least one of the second layer and the first layer includes a plurality of fluid control devices that are each positioned between adjacent hollow cells and are each coupled in flow communication, wherein the fluid control devices selectively control flow communication independently to each of the plurality of hollow cells.

DETAILED DESCRIPTION OF THE INVENTION

Figure 1:
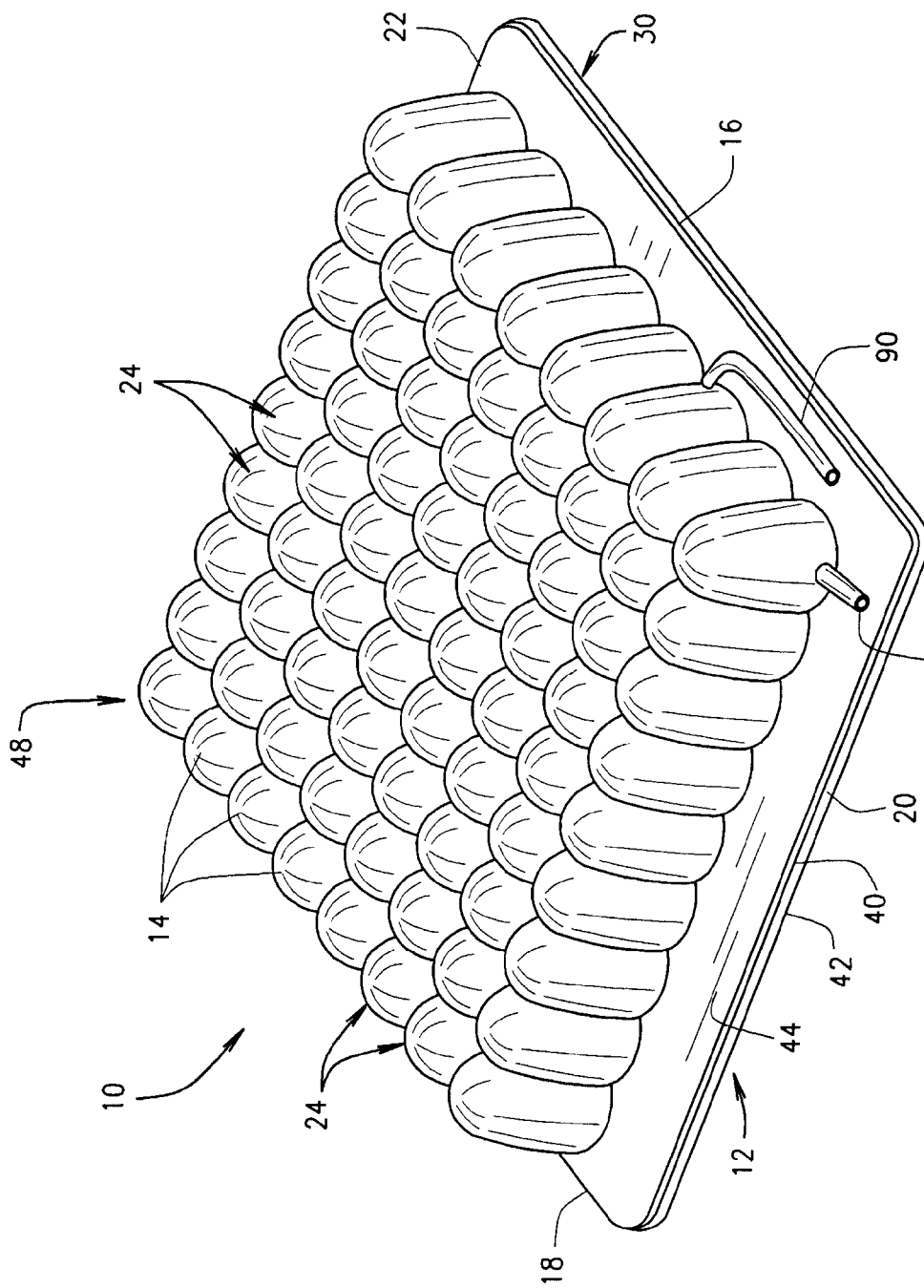
FIG. 1 is a perspective view of an exemplary cellular cushion.
Figure 2:
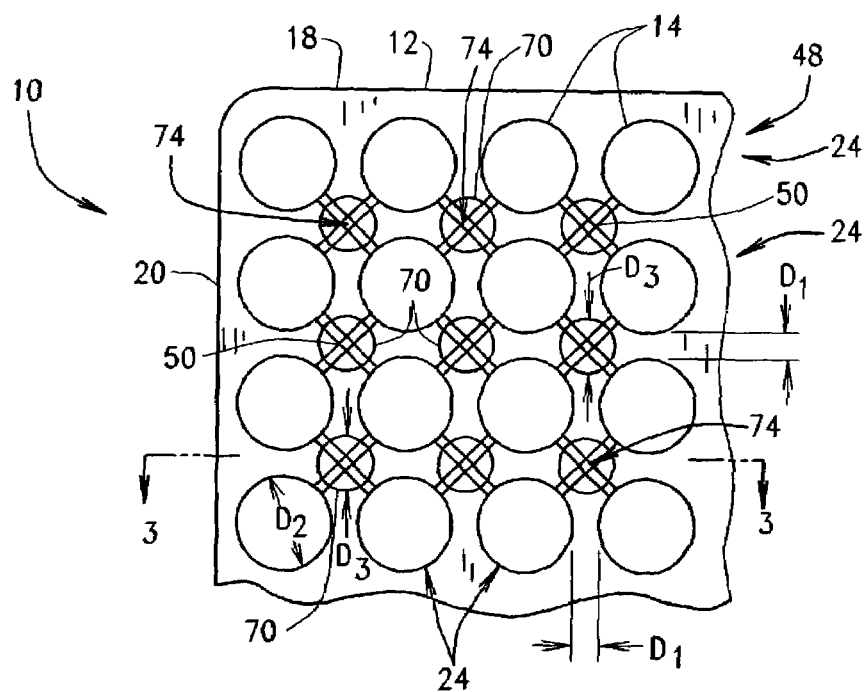
FIG. 2 is a plan cross-sectional view of a portion of the cellular cushion shown in FIG. 1.
Figure 3:
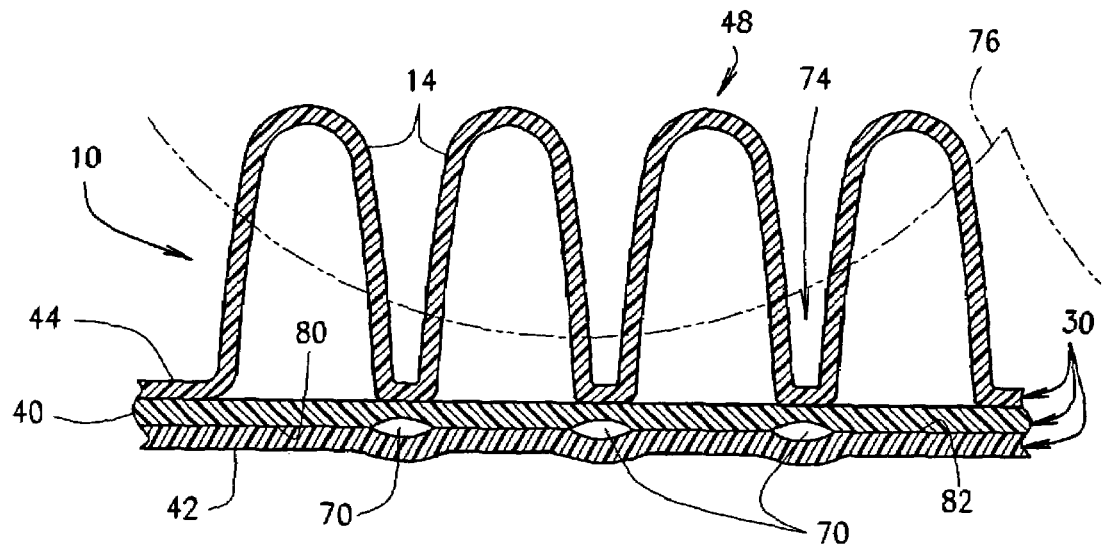
FIG. 3 is a cross-sectional view of a portion of the cellular cushion shown in FIG. 2 and taken along line 3-3.
Figure 4:
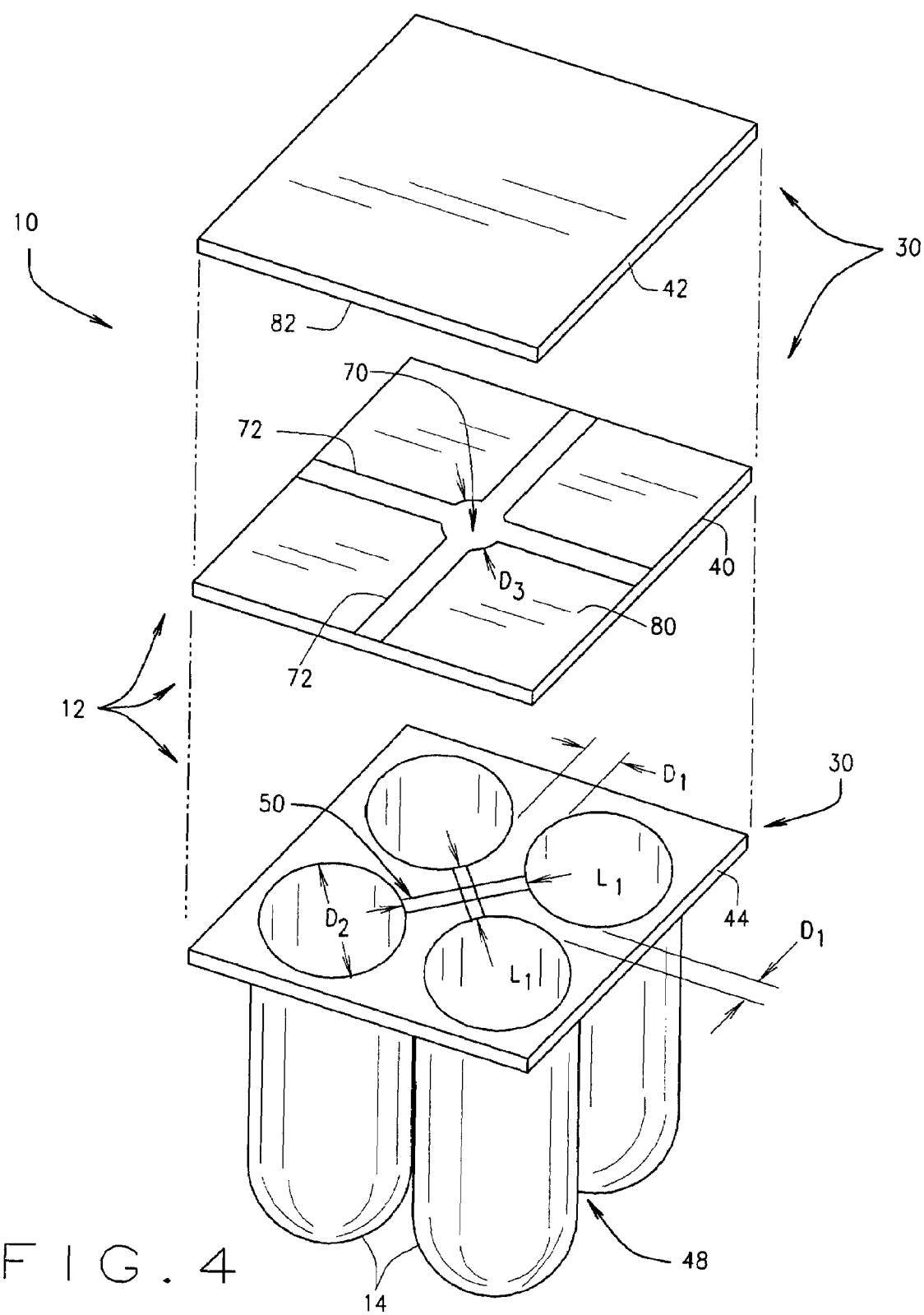
FIG. 4 is an exploded view of the cellular cushion shown in FIG. 1, and viewed from the bottom side of the cellular cushion.

FIG. 1 is a perspective view of an exemplary cellular cushion 10. FIG. 2 is a plan cross-sectional view of a portion of cellular cushion 10. FIG. 3 is a cross-sectional view of a portion of cellular cushion 10. FIG. 4 is an exploded view of cellular cushion 10. Cushion 10 is flexible and as described herein, is configured for use on an underlying support surface, such as, but not limited to a chair seat, a mattress, or a wheelchair. Cushion 10 includes a base 12 and a plurality of hollow cells 14. In the exemplary embodiment, base 12 is substantially rectangular and includes a forward side 16 and a rear side 18 connected together by a pair of opposing sides 20 and 22. In an alternative embodiment, base 12 is non-rectangular. In the exemplary embodiment, cells 14 are arranged in a plurality of rows 24 which extend substantially across base 12 between sides 20 and 22, and between forward and rear sides 16 and 18, respectively. In an alternative embodiment, cells 14 are arranged in other geometric configurations and not arranged in rows 24.

Base 12 is flexible and is formed from a plurality of layers 30 that are coupled together. In one embodiment, base 12 and cells 14 are formed from a flexible neoprene. Alternatively, base 12 and cells 14 are formed from a non-neoprene material that enables cellular cushion 10 to function as described herein. In the exemplary embodiment, a middle layer 40 and an outer layer 42 are each coupled to a conformal layer 44 to form base 12, as described in more detail below. In one embodiment, at least one layer 40, 42, and/or 44 is fabricated from a material that prevents that specific layer from bonding against the other layers. In an alternative embodiment, base 12 includes more than three layers 30. In a further alternative embodiment, base 12 only includes conformal layer 44 and middle layer 40.

Conformal layer 44 is formed unitarily with cells 14 such that cells 14 are coupled together in an arrangement 48 of air cells 14 such that all cells 14 are in fluid flow communication with each other, as described in more detail below. In an alternative embodiment, cells 14 across layer 44 are not all coupled together in fluid flow communication, but rather, layer 44 is defined into regions or quadrants of cells 14 that are coupled together in fluid flow communication with each other, as described in more detail below. More specifically, in the exemplary embodiment, cells 14 are positioned substantially symmetrically across conformal layer 44 within cell arrangement 48, such that adjacent cells 14 are separated by a substantially equal distance $D_1$. In an alternative embodiment, cells 14 are separated by variable distances. In an alternative embodiment, conformal layer cells 14 are coupled together in a different arrangement and/or orientation with respect to each other.

In the exemplary embodiment, conformal layer 44 is molded with cells 14. In an alternative embodiment, cells 14 are coupled to layer 44. In a further alternative embodiment, cells 14 are formed integrally with layer 44 using an injection molding process. In the exemplary embodiment, cells 14 are all identical and each has an identical height H and because each is substantially circular, each has an identical diameter $D_2$. Alternatively, a plurality of different-sized cells extend from base 12.

A plurality of channels 50, known as release-agent channels, extend between adjacent cells 14. More specifically, channels 50 are arranged in X-shaped patterns that extend between four adjacent cells 14. Channels 50 are coupled in sealing contact with conformal layer 44. In one embodiment, channels 50 are coupled to layer 44 using a silk screening process. In another embodiment, channels 50 are formed integrally with conformal layer 44. In a further embodiment, channels 50 are coupled to layer 44 using an X-Y printing machine process. In yet another embodiment, channels 50 are coupled to layer 44 using an adhesive process. In a further embodiment, channels 50 are formed using a liquid gasket process. In another embodiment, channels 50 are formed using a spray process. In a further embodiment, channels 50 are coupled to layer 44 using any process that enables channels 50 to couple to layer 44 such that adjacent cells 14 are coupled together in flow communication.

A release agent is contained within each channel 50. The release agent facilitates ensuring that channels 50 remain substantially unobstructed during the assembly of cushion 14, such that adjacent cells 14 remain in fluid flow communication. More specifically, and as described in more detail below, during assembly of cushion 14, the release agent ensures that adjacent cushion layers 30 remain separated to define channels 50. In the exemplary embodiment, the release agent is formed of a low viscous solution of talc powder and a carrier, such as, but not limited to alcohol, that is applied using a high volume low pressure (HVLP) sprayer. In another embodiment, the release agent is any solution that performs as described herein, and more specifically, prevents the bonding together of the layers 40, 42, and 44, such as, but not limited to, petroleum-based mixtures.

Middle layer 40 is sized approximately the same size as conformal layer 44 as defined by an outer perimeter of each layer 40 and 44. In the exemplary embodiment, layer 40 defines a plurality of fluid control devices 70 that are coupled together across cushion 10 in fluid flow communication. In the exemplary embodiment, fluid control devices 70 are known as lock pockets. In an alternative embodiment, lock pockets 70 extending across layer 40 are not all coupled together in fluid flow communication, but rather, layer 40 is defined into regions or quadrants of lock pockets 70 that are coupled together in fluid flow communication with each other to perform as described herein. More specifically, lock pockets 70 are coupled together by a plurality of lock pocket channels 72, such that middle layer 40 functions analogous to a manifold. In the exemplary embodiment, lock pockets 70 are substantially circular and each has a diameter $D_3$ that is less than a length $L_1$ of conformal layer channel 50. In an alternative embodiment, lock pockets 70 are non-circular.

In another alternative embodiment, cushion 10 does not include lock pockets 70, but rather includes a plurality of other fluid control devices which operate to perform the same flow communication function as lock pockets 70 as described herein. For example, such control devices may include, but are not limited to including, mechanical devices, electromechanical devices, pneumatic devices, hydraulic devices, electrical devices, or magnetic devices.

Lock pockets 70 are arranged in a pattern that extends across layer 40 such that each respective lock pocket 70 is positioned substantially concentrically with respect to the center intersection 74 of X-shaped channels 50, when layer 40 is coupled to conformal layer 44. Accordingly, in this arrangement, when layers 44 and 40 are coupled together, lock pocket channels 72 are substantially centered, and extend, between adjacent cells 14. In an alternative embodiment, lock pockets 70 are not concentrically oriented with respect to channel intersection 74, but rather are still positioned relative to channels 50 to enable lock pockets 70 and cushion 10 to perform as described herein.

In the exemplary embodiment, lock pockets 70 and lock pocket channels 72 are formed within layer 40 by coupling polymers to layer 40. In one embodiment, the polymers are coupled via a radio frequency welding process, wherein the polymers are positioned across layer 40 in the pattern described above, such that layer 40 may then be coupled to conformal layer 44. In one embodiment, layer 40 is coupled to layer 44 with a lamination process. Specifically, in the exemplary embodiment, prior to layer 40 being coupled to layer 44, an adhesive material is applied to layer 40 such that the adhesive material extends substantially across layer 40 between lock pockets 70 and lock pocket channels 72.

When layer 40 is coupled to conformal layer 44, layer 40 mates in sealing contact with areas of conformal layer 44 that extend between adjacent cells 14, and around an outer perimeter of each cell 14. More specifically, when layer 40 is coupled to layer 44, lock pockets 70 and lock pocket channels 72 are properly oriented relative to cells 14, and are defined against conformal layer 44. In another embodiment, lock pocket channels 72 are defined between layers 44 and 40. The release agent prevents layer 40 from sealing against conformal layer 44 in areas defined by channels 50, such that, as described in more detail below, fluid flow between layers 40 and 44 is only possible through channels 50.

After layers 40 and 44 are coupled together, outer layer 42 is coupled to layer 40 such that layer 40 extends between conformal layer 44 and outer layer 42.

Base 12 also includes a pair of inflation/deflation valves 90 and 92 that extend from base 12. Valve 90 is known as a fluid locking pocket valve and is only coupled in flow communication to locking pockets 70 via channels 72. Specifically, valve 90 may be selectively opened and closed to enable fluid to be injected into, or discharged from, lock pockets 70. In an alternative embodiment, base 12 includes a plurality of inflation/deflation valves 90 and/or 92. More specifically, because layer 40 is coupled to conformal layer 44 except at pockets 70, channels 72, and channels 50, this enables air to pass between layers 44 and 40 through channels 72 and into lock pockets 70. Accordingly, because lock pockets 70 are coupled together in flow communication, valve 90 enables the fluid pressure within pockets 70 to be adjusted substantially simultaneously, such that the fluid pressure within all lock pockets 70 is approximately equal. In the exemplary embodiment, the working fluid supplied to lock pockets 70 is air. In an alternative embodiment, the working fluid is any fluid that enables cushion 10 to function as described herein, including, but not limited to, other gases, fluids, or liquids.

Valve 92 is known as a cushion valve and is only coupled in flow communication to cells 14 through channels 50. Specifically, valve 92 may be selectively opened and closed to enable fluid to be injected into, or discharged from, cells 14. More specifically, because layer 40 is coupled to conformal layer 44 except at pockets 70, channels 72, and channels 50, airflow is possible between layers 44 and 40 through channels 50 and into cells 14. Accordingly, in the exemplary embodiment, because cells 14 are coupled together in flow communication, when cells 14 are initially inflated, and prior to a user 76 being seated on cushion 10, cells 14 are each pressurized to approximately the same fluid pressure. In the exemplary embodiment, the working fluid supplied to cells 14 is air. In an alternative embodiment, the working fluid is any fluid that enables cushion 10 to function as described herein, including, but not limited to, other gases, fluids, or liquids.

During use, in the exemplary embodiment, initially cushion 10 is inflated by introducing air through valve 92 into channels 50 and cells 14. Moreover, in the exemplary embodiment, cells 14 are pressurized substantially equally across cushion 10 and each cell 14 is inflated to have a generally circular cross-sectional profile. In an alternative embodiment, cells 14 have a non-circular cross-sectional profile. In a further alternative embodiment, layer 44 is defined into regions or quadrants of cells 14 that are coupled together in fluid flow communication with each other, and cells 14 within each region or quadrant are inflated to substantially the same fluid pressure. Specifically, the fluid pressure of each cell 14 is variably selectable by the seated user 76 based on comfort and/or seated immersion requirements, and is adjustable by either adding additional air, or opening valve 92 to decrease the pressure in cells 14. More specifically, as cells 14 are inflated, adjacent cells 14 contact each other, such that cells 14 form a generally continuous, and highly displaceable, supporting surface that is highly conformable to the seated user 76.

When all of the cells 14 are inflated together, which is normally the case, the sides of adjacent cells 14 contact each other and form a generally continuous, but highly displaceable, supporting surface. Moreover, in the exemplary embodiment, because cushion 10 is cellular, the weight of the seated user 76 is distributed broadly with decreasing peak pressures across the entire area of the user's buttocks and therefore, cushion 10 dissipates pressures resulting from the weight supported at the ishia, or bony prominences of the buttocks.

After the fluid pressure within cells 14 is substantially equalized, such that in the exemplary embodiment, each cell 14 contains approximately the same fluid pressure, air is introduced into lock pockets 70 through valve 90 and channels 72. More specifically, as air is introduced into lock pockets 70, the fluid pressure within pockets 70 is increased. Because each pocket 70 is positioned substantially concentrically with respect to the center intersection 74 of X-shaped channels 50, increasing the pressure within pockets 70 increases an amount of force induced to each center intersection 74. More specifically, as force is applied to channels 50, and specifically to intersection 74, flow communication is stopped between the immediate four cells 14 coupled together by the respective channels 50. In another embodiment, the fluid pressure within lock pockets 70 is not sufficient to stop flow communication between the immediate four cells 14 until a user 76 is seated on cushion 10.

Accordingly, fluid flow between cells 14 across cushion 10 is limited by lock pockets 70. As such, cushion 10 facilitates providing a more stable and more secure sitting surface to users 76 in comparison to that provided by other known cellular cushions. In particular, cushion 10 provides a stable and secure sitting surface even to a user 76 that does not have the energy and/or strength to maintain their pelvis in a symmetrical posture, or to those users 76 that may have a fixed deformity, such as a pelvic obliquity, that requires the sitting surface to conform to the user 76 without bottoming out. In addition, cushion 10 facilitates reducing sitting fatigue induced to, and increasing postural control of, the seated user 76. Furthermore, in the exemplary embodiment, because cushion 10 is not segmented into zones of cells that are not in flow communication, but rather because all cells 14 are coupled in fluid flow communication, if a cell 14 develops a leak, the seated user 76 will not bottom out because lock pockets 70 enable only fluid pressure to escape from the particular cell 14 that developed the leak, rather than from all cells 14.

In an alternative embodiment, cushion 10 is supplied to the user 76 as a totally enclosed cushion that is pre-pressurized and does not include valves 90 and 92. Although cushion 10 provides a sitting surface for a seat, in a further alternative embodiment, cushion 10 is used for other cushioning purposes.

Figure 5:
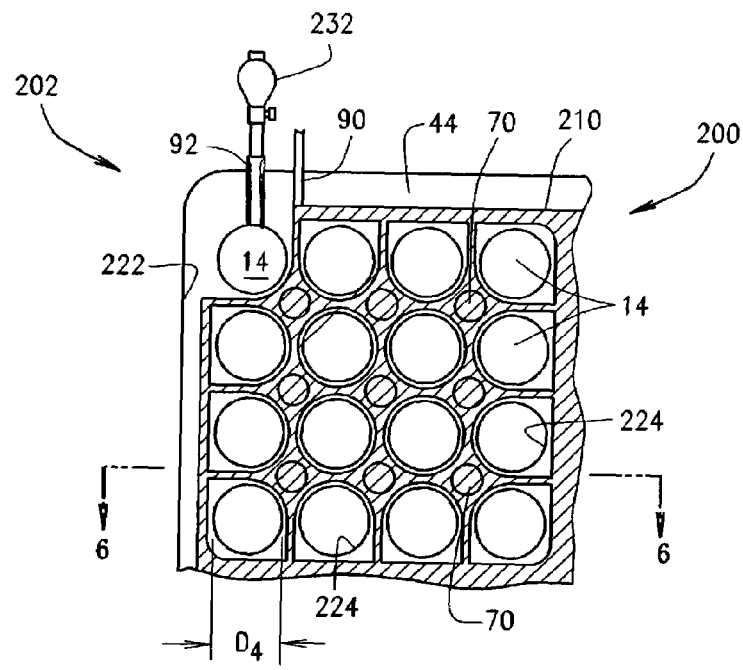
FIG. 5 is a plan view of a portion of an alternative cellular cushion.
Figure 6:
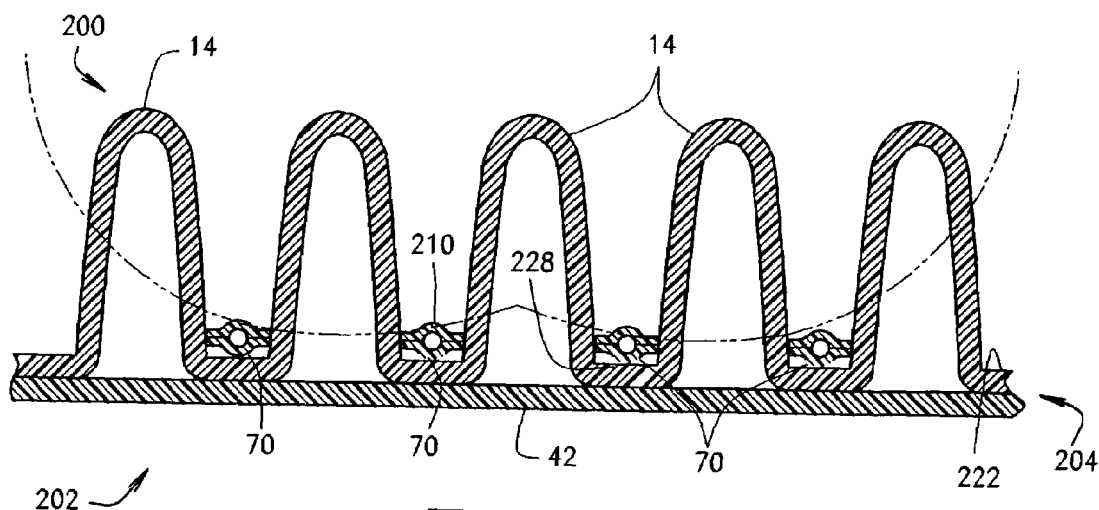
FIG. 6 is a cross-sectional view of a portion of the cellular cushion shown in FIG. 5.

FIG. 5 is a plan view of a portion of an alternative cellular cushion 200. FIG. 6 is a cross-sectional view of a portion of cellular cushion 200. Cushion 200 is substantially similar to cushion 10 (shown in FIGS. 1-4) and components in cushion 200 that are identical to components of cushion 10 are identified in FIGS. 5 and 6 using the same reference numerals used in FIGS. 1-4. Accordingly, cushion 200 includes a base 202 that is substantially similar to base 12 and cells 14. Base 202 is formed from a plurality of layers 204 that are coupled together. More specifically, outer layer 42 and an upper layer 210 are each coupled to conformal layer 44 to form base 202. In an alternative embodiment, base 12 includes more than three layers 204.

In the exemplary embodiment, upper layer 210 has a cross-sectional area defined by an outer perimeter that is smaller than the cross-sectional area defined by conformal layer 44. Upper layer 210 defines a plurality of lock pockets 70 therein that are coupled together in flow communication. In another embodiment, upper layer 210 has a cross-sectional area that is approximately the same size, or larger than, the cross-sectional area of conformal layer 44. More specifically, the cross-sectional area defined by the outer perimeter of upper layer 210 is variably selected based on the number of cells 14 contained extending from conformal layer 44, and the associated number of lock pockets 70 and lock pocket channels 72 to be defined therein. Accordingly, in the exemplary embodiment, upper layer 210 extends around substantially all of cells 14, with the exception of cells 14 positioned in the corners of cushion 200. Specifically, the size, shape, and orientation of layer 210 is variably selected to ensure that lock pockets 70 perform as described herein. More specifically, in the exemplary embodiment, layer 210 is selected to ensure lock pockets 70 are each positioned substantially concentrically with respect to the center intersection 74 of X-shaped channels 50, when layer 210 is coupled to conformal layer 44.

In the exemplary embodiment, lock pockets 70 and lock pocket channels 72 are formed within layer 210 by polymers that are coupled to layer 210. In one embodiment, the polymers are coupled via a radio frequency welding process, wherein the polymers are positioned across layer 210 in the pattern described above, such that layer 210 may then be laminated to an upper surface 222 of conformal layer 44. Specifically, prior to layer 210 being coupled to layer 44, an adhesive material is applied to layer 210 such that the adhesive material extends substantially across layer 210 between lock pockets 70 and lock pocket channels 72.

Upper layer 210 also includes a plurality of openings 224 extending therethrough. Each opening 224 is sized to receive at least a portion of each cell 14 therethrough when layer 210 is coupled to conformal layer 44. Accordingly, in the exemplary embodiment, because cells 14 are substantially identical, each opening 224 is sized identically with a diameter $D_4$ that is slightly larger than cell diameter $D_2$. More specifically, when layer 210 is coupled to conformal layer 44, layer 210 couples in sealing contact with areas of conformal layer 44 extending between adjacent cells 14, and around an outer perimeter of each cell 14. Accordingly, when layer 210 is coupled to layer 44, lock pockets 70 and lock pocket channels 72 are properly oriented relative to cells 14, and are thus between conformal layer upper surface 222 and a lower surface 228 of layer 210.

After layers 210 and 44 are coupled together, outer layer 42 is coupled against conformal layer lower surface 82. Accordingly, in the exemplary embodiment, conformal layer channels 50 are defined between conformal layer 44 and outer layer 42. The release agent prevents outer layer 42 from sealing against conformal layer 44 in areas defined by channels 50. In another embodiment, cushion 200 includes lock pockets 70 defined above conformal layer 44 and below conformal layer 44.

Base 202 also includes inflation/deflation valves 90 and 92. In the exemplary embodiment, valve 90 is coupled to a bulb pump 232 that facilitates air flow into lock pockets 70. In another exemplary embodiment, both valves 90 and 92 are coupled in flow communication within base 202 to bulb pump 232 through a third valve that is selectively positionable to enable air flow to enter either valve 90 or valve 92 when bulb pump 232 is activated. It should be noted that other valving arrangements are possible.

During use, initially cushion 200 is inflated by introducing air through valve 92 into channels 50 and cells 14, and then through valve 90 into lock pockets 70 and channels 72. In the exemplary embodiment, cells 14 are pressurized substantially equally across cushion 200 and each cell 14 is inflated to have a generally circular cross-sectional profile. In an alternative embodiment, cells 14 have a non-circular cross-sectional profile. Specifically, the fluid pressure of each cell 14 is variably selectable by the seated user 76 based on comfort requirements, and is adjustable by either adding additional air, or opening valve 92 to decrease the pressure in cells 14. More specifically, as cells 14 are inflated, adjacent cells 14 contact each other, such that cells 14 form a generally continuous, and highly displaceable, supporting surface that is highly conformable to the seated user 76.

When all of the cells 14 are inflated, the sides of adjacent cells 14 contact each other and form a generally continuous, but highly displaceable, supporting surface. Moreover, because cushion 200 is cellular, the weight of the seated user 76 is distributed broadly with decreasing peak pressures across the entire area of the user's buttocks and therefore, cushion 200 dissipates pressures resulting from the weight supported at the ishia, or bony prominences of the buttocks.

Furthermore, after cells 14 are inflated, air is introduced into lock pockets 70 through valve 90 and channels 72 such that the fluid pressure within pockets 70 is increased. Because each pocket 70 is positioned substantially concentrically with respect to the center intersection 74 of X-shaped channels 50, increasing the pressure within pockets 70 increases an amount of force induced to each center intersection 74. In one embodiment, the increased fluid pressure within lock pockets 70 stops flow communication between each adjacent cell 14. In another embodiment, as user 76 sits on cushion 200, the weight of the user induced to lock pockets 70 increases fluid pressure acting on intersection 74 and causes flow communication to stop between adjacent cells 14.

Accordingly, fluid flow between cells 14 across cushion 200 is limited by lock pockets 70. As such, cushion 200 facilitates providing a more stable and more secure sitting surface to all users in comparison to that provided by other known cellular cushions. In particular, cushion 200 provides a stable and secure sitting surface even to a user 76 that does not have the energy and/or strength to maintain their pelvis in a symmetrical posture, or to those users 76 that may have a fixed deformity, such as a pelvic obliquity, that requires the sitting surface to conform to the user 76 without bottoming out. In addition, cushion 200 facilitates reducing sitting fatigue induced to the seated user 76 while also providing enhanced postural control to the seated user 76. Furthermore, because cushion 200 is not segmented, but rather because all cells 14 are coupled in fluid flow communication, if a cell 14 develops a leak, the seated user 76 will not bottom out on cushion 200 because lock pockets 70 enable only fluid pressure to escape from the particular cell 14 that developed the leak, rather than from all cells 14.

Figure 7:
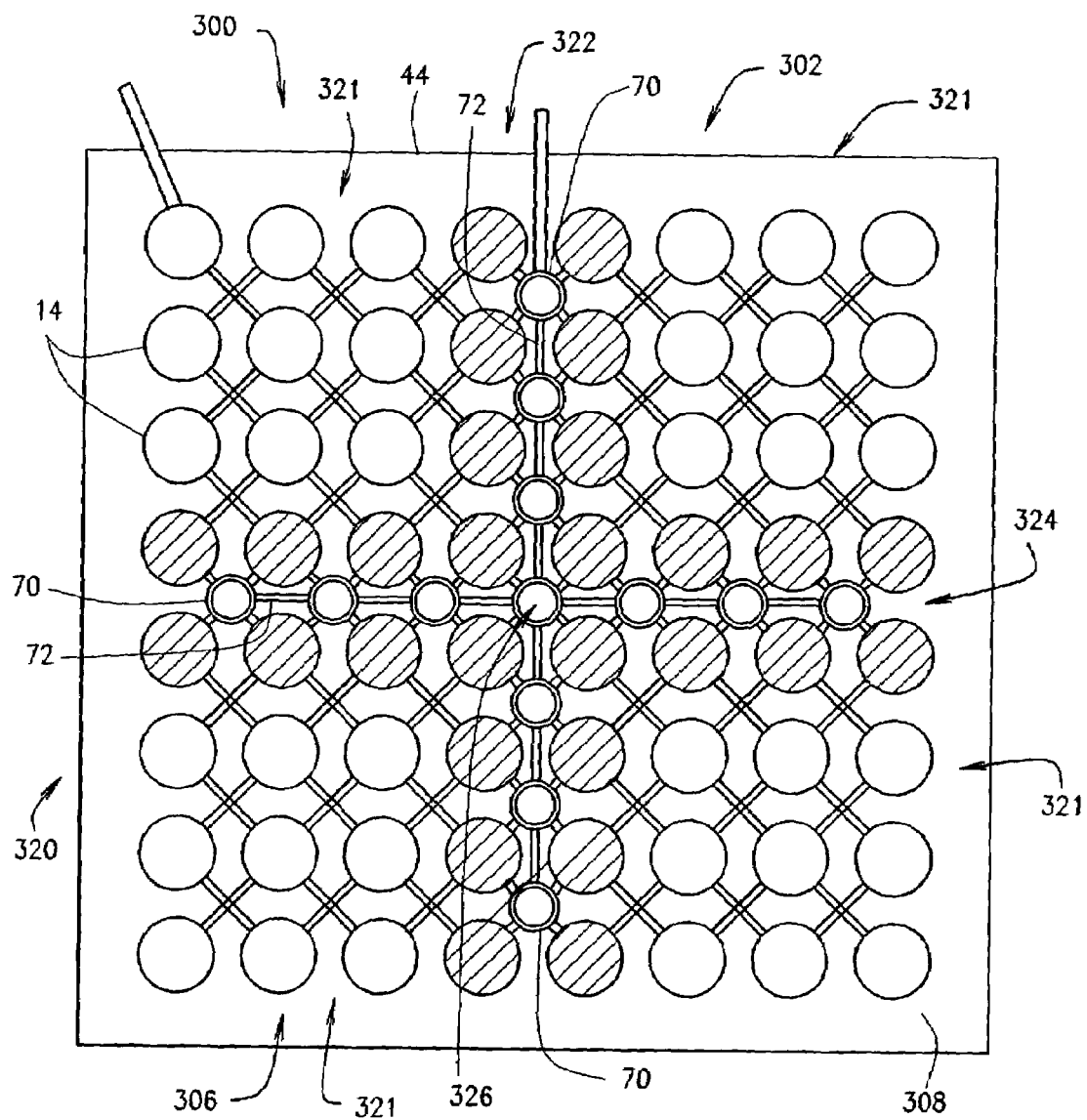
FIG. 7 is a partial plan view of an alternative cellular cushion including a lock pocket arrangement that may be used with the cellular cushion shown in FIG. 1.

FIG. 7 is a partial plan view of an alternative cellular cushion 300 including a lock pocket arrangement 302 that may be used with cellular cushion 10 (shown in FIG. 1). More specifically, cushion 300 is substantially similar to cushion 10 (shown in FIGS. 1-4) and components in cushion 300 that are identical to components of cushion 10 are identified in FIG. 7 using the same reference numerals used in FIGS. 1-4. Accordingly, cushion 300 includes cells 14 and a base 304 that is substantially similar to base 12. Base 302 is formed from a plurality of layers 306 that are coupled together. More specifically, base 302 is formed with conformal layer 44, outer layer 42 (shown in FIGS. 1, 3, 4, and 6), and a secondary layer 308 that includes a plurality of lock pockets 70.

Conformal layer 44, secondary layer 308, and outer layer 42 are coupled together to form base 12. More specifically, in the exemplary embodiment, secondary layer 308 is substantially similar to middle layer 40 (shown in FIGS. 1-4) and is coupled to conformal layer 44 such that secondary layer 308 extends between conformal layer 44 and outer layer 42. In another embodiment, secondary layer 308 is substantially similar to upper layer 210 (shown in FIGS. 5 and 6) and is coupled to conformal layer 44 such that conformal layer 44 extends between layer 40 and outer layer 42.

Lock pockets 70 and lock pocket channels 72 are defined within secondary layer 308 and are arranged in a pre-determined or programmed pattern 320 that is variably selected to meet a user's requirements. Moreover, in the exemplary embodiment, the pattern 320 of lock pockets 70 defines secondary layer 308 into quadrants 321 of cells 14 that do not include lock pockets 70, and as such, are non-controllable by lock pockets 70. Specifically, in the exemplary embodiment, lock pockets 70 are oriented within pattern 320 in a substantially plus-sign (+) shape, and rather than extending across substantially all of layer 308, pockets 70 are defined within a pair of rows 322 and 324 that are oriented substantially perpendicular to each other. Alternatively, in other patterns 320, lock pockets 70 are arranged in other configurations and orientations with respect to secondary layer 308. More specifically, in the exemplary embodiment, each row 322 and 324 is substantially centered with respect to cushion 300, such that rows 322 and 324 intersect at an approximate center 326 of cushion 300.

Because lock pockets 70 do not extend substantially across cushion 300, quadrants 321 are defined within layer 308 by lock pocket rows 322 and 324. Specifically, although cells 14 are coupled in flow communication across conformal layer 44, only those cells 14 immediately adjacent rows 322 and 324 are effected by, and selectively controllable by lock pockets 70. In another embodiment, only cells 14 defined within each quadrant 321 are in flow communication, and as such, each quadrant 321 includes an inflation/deflation valve 92, and cushion 300 may include a plurality of inflation/deflation valves 90. More specifically, only those cells 14 separated by lock pockets 70 are selectively controllable, as described herein with respect to controlling fluid flow communication between the cells 14. Accordingly, patterns 320 are variably selected, based on a plurality of factors, including, but not limited to the physical limitations and/or demands of the user 76, such that cushion 300 facilitates providing the user 76 with varying degrees of control and comfort, without sacrificing stability to the user 76. It should be expressly noted that programmable patterns, such as pattern 320, may be employed with any cellular cushion that functions as described herein, and as such, is not limited to being used only with cushion 300.

The above-described cellular cushions provide a user with a sitting surface that is selectively controllable to facilitate increasing stability and comfort to the user. More specifically, the cellular cushions each include a conformal layer that includes a plurality of cells extending therefrom, wherein each cell extending from the conformal layer is coupled in flow communication with every other cell extending from the conformal. Furthermore, each cellular cushion includes a layer that defines a plurality of lock pockets therein that facilitate selectively controlling fluid flow communication between at least some of the cells within the cushion. In addition, the lock pockets facilitate preventing the seated user from bottoming out while seated on the cushion and/or while the user shifts their weight relative to the cushion. Furthermore, the lock pockets facilitate preventing a plurality of cells from deflating, in the event that an individual cell is punctured. As a result, a cellular cushion is provided which facilitates increasing the sitting support and stability provided to a seated user in a cost-effective and reliable manner.

Exemplary embodiments of cellular cushions are described above in detail. Although the cellular cushions are herein described and illustrated in association with seated users, it should be understood that the present invention may be used to provide cushioning in a plurality of other uses. Moreover, it should also be noted that the components of each cellular cushion are not limited to the specific embodiments described herein, but rather, aspects of each cushion and fabrication method may be utilized independently and separately from other methods described herein. For example, each of the above-described cellular cushions can employ lock pocket patterns as described in FIG. 7.

While the invention has been described in terms of various specific embodiments, those skilled in the art will recognize that the invention can be practiced with modification within the spirit and scope of the claims.

What is claimed is:

1. A cellular cushion comprising:
a base comprising at least a first layer and a second layer;
a plurality of hollow cells coupled to, and extending outward from, only one of said first layer and said second layer, each of said plurality of cells extends from a root defined at only one of said first layer and said second layer outwardly to a tip, said plurality of cells coupled together in flow communication via a plurality of channels extending between adjacent said cells, said plurality of channels aligned substantially within the same plane; and
a sealing layer coupled to at least one of said base first and second layers, at least one of said sealing layer and said base defining a plurality of cavities therein, each of said plurality of cavities is positioned between adjacent said hollow cells such that each of said pluralities of cavities is positioned against at least one of said plurality of channels extending between adjacent said hollow cells, each of said plurality of cavities is configured to be pressurized for controlling flow communication independently to each of said plurality of hollow cells extending from the same base layer and coupled together by said at least one channel within said cellular cushion.

2. A cellular cushion in accordance with claim 1 wherein said plurality of hollow cells are oriented in rows, said plurality of channels are arranged in X-shaped patterns that extend between pairs of said hollow cells in adjacent rows, each of said channels within said X-shaped patterns intersects, and is coupled in flow communication with, at least one other channel in said X-shaped patterns, each of said plurality of cavities is positioned against an intersection of at least two of said channels.

3. A cellular cushion in accordance with claim 2 wherein each of said channels within said plurality of X-shaped patterns contains a release agent therein.

4. A cellular cushion in accordance with claim 3 wherein said plurality of X-shaped patterns are coupled to at least one of said first layer and said second layer.

5. A cellular cushion in accordance with claim 3 wherein said plurality of X-shaped patterns are coupled to said base by at least one of a lamination process, a silk screening process, an adhesive process, a liquid gasket process, a spray process, and a printing process.

6. A cellular cushion in accordance with claim 1 further comprising a first inflation valve coupled only in flow communication to said plurality of hollow cells for changing an operating pressure only within said plurality of hollow cells.

7. A cellular cushion in accordance with claim 6 further comprising a second inflation valve coupled only in flow communication to said sealing layer for changing an operating pressure only within said plurality of cavities.

8. A cellular cushion in accordance with claim 1 further comprising a fluid inflator configured to be coupled in flow communication through at least one inflation valve to said plurality of hollow cells and said sealing layer for changing an operating pressure within at least one of said plurality of hollow cells and said plurality of cavities.

9. A cellular cushion in accordance with claim 1 wherein said plurality of cavities are defined by said base second layer, said hollow cells extending from said first layer, said second layer between said base first layer and said sealing layer.

10. A cellular cushion in accordance with claim 1 wherein said plurality of cavities are formed with said sealing layer, said hollow cells extending from said first layer, said first layer between said base second layer and said sealing layer.

11. A cellular cushion in accordance with claim 1 wherein said plurality of cavities facilitate increasing the stability of said cellular cushion.

12. A cellular cushion in accordance with claim 1 wherein said plurality of cavities facilitate reducing sitting fatigue of a user.

13. A cellular cushion comprising:
a flexible base comprising a plurality of layers;
a plurality of hollow cells coupled to, and extending outward from, only one of said base plurality of layers, such that each of said cells extends from a root defined at said base layer to a tip, said plurality of cells comprising at least a first cell, a second cell, and a third cell coupled together in flow communication with each other via a plurality of hollow channels, such that said second cell is between said first and third cells, said plurality of hollow channels are aligned substantially in the same plane; and
a sealing layer coupled to said base such that a plurality of fluid control devices are defined by at least one of said base and said sealing layer, each of said plurality of fluid control devices is positioned between said plurality of hollow cells such that each of said fluid control devices is positioned against at least one of said plurality of hollow channels, such that actuation of said plurality of fluid control devices causes said fluid control devices to induce pressure against at least one of said plurality of hollow channels, such that said plurality of fluid control devices selectively control flow communication independently to each of said first, second, and third hollow cells.

14. A cellular cushion in accordance with claim 13 wherein said plurality of fluid control devices facilitate increasing a stability to a user seated on said cellular cushion.

15. A cellular cushion in accordance with claim 13 wherein said plurality of fluid control devices facilitate reducing sitting fatigue of a user seated on said cellular cushion.

16. A cellular cushion in accordance with claim 13 wherein said plurality of fluid control devices are formed within said base such that said plurality of fluid control devices are positioned between said plurality of hollow cells and said sealing layer.

17. A cellular cushion in accordance with claim 13 wherein said sealing layer comprises an upper surface, a lower surface, and a plurality of openings extending therebetween, said sealing layer lower surface coupled against said base such that each of said plurality of hollow cells extends upwardly through a respective sealing layer opening.

18. A cellular cushion in accordance with claim 17 wherein said plurality of fluid control devices are formed with said sealing layer, such that said sealing layer lower surface is between said base and said plurality of fluid control devices.

19. A cellular cushion in accordance with claim 13 wherein said plurality of hollow channels comprise a plurality of channels arranged in X-shaped patterns extending between adjacent said hollow cells, each of said channels in said X-shaped patterns intersects, and is coupled in flow communication with, at least one other channel in said plurality of X-shaped patterns.

20. A cellular cushion in accordance with claim 13 wherein said plurality of hollow channels comprise a plurality of channels arranged in X-shaped patterns extending between adjacent said hollow cells, said plurality of X-shaped patterns are coupled to at least one of said sealing layer and said base.

21. A cellular cushion in accordance with claim 20 wherein said plurality of X-shaped patterns are coupled to at least one of said sealing layer and said base by at least one of an RF welding process, a lamination process, a silk screening process, an adhesive process, and a printing process.

22. A cellular cushion in accordance with claim 13 further comprising a first inflation valve coupled only in flow communication to said plurality of hollow cells for changing an operating pressure of fluid only within said plurality of hollow cells.

23. A cellular cushion in accordance with claim 22 further comprising a second inflation valve coupled only in flow communication to said sealing layer for changing an operating pressure within said plurality of fluid control devices.

24. A cellular cushion comprising:
a base comprising at least one layer;
a plurality of hollow fluid-containing cells coupled to, and extending outward from, only one of said layers of said base, each of said cells extends outward from a root defined at said layer to a tip, a cavity defined within each said cell coupled in flow communication with every other cell cavity through a plurality of channels extending between adjacent said cells, said plurality of channels are aligned substantially in the same plane; and
a manifold coupled to said base, at least one of said manifold and said base further comprises a plurality of fluid control devices, each of said plurality of fluid control devices is positioned between adjacent pairs of said plurality of hollow fluid-containing cells such that each of said fluid control devices is against at least one of said plurality of channels for selectively controlling flow communication between adjacent cells such that a fluid pressure within each of said cell cavities extending from the same layer and coupled together in flow communication by said plurality of channels is independently controlled by said plurality of fluid control devices.

25. A cellular cushion in accordance with claim 24 wherein said manifold plurality of fluid control devices facilitate at least one of increasing a stability to a user seated on said cellular cushion, and reducing sitting fatigue of a user seated on said cellular cushion.

26. A cellular cushion in accordance with claim 24 wherein said manifold comprises a plurality of openings extending therethrough, each of said plurality of hollow fluid-containing cells extends through a respective one of said plurality of manifold openings.

27. A cellular cushion in accordance with claim 26 further comprising a sealing layer coupled to said base such that said base is between said manifold and said sealing layer.

28. A cellular cushion in accordance with claim 24 further comprising a sealing layer coupled to said base such that said manifold is between said base and said sealing layer.

29. A cellular cushion in accordance with claim 24 wherein said plurality of channels are arranged in a plurality of X-shaped patterns that extend between adjacent said cells.

30. A cellular cushion in accordance with claim 29 wherein said plurality of X-shaped patterns are coupled to at least one of a sealing layer and said base using at least one of an RF welding process, a lamination process, a silk screening process, an adhesive process, and a printing process.

31. A method of fabricating a cellular cushion, said method comprising:

forming a first base layer including a plurality of hollow cells that extend outward from the same base layer and are each coupled together in flow communication via a plurality of channels extending between adjacent hollow cells, wherein the first base layer and the plurality of hollow cells are formed integrally together, and wherein each of the hollow cells extends outward from a root defined adjacent the first base layer to a tip;

coupling a second layer to the first layer such that the plurality of channels are aligned substantially in the same plane; and coupling a third layer to at least one of the first layer and the second layer wherein at least one of the second layer and the first layer includes a plurality of fluid control devices that are each positioned between adjacent hollow cells and against at least one of the plurality of channels, and such that each of the plurality of fluid control devices are coupled together in flow communication, and wherein the plurality of fluid control devices induce pressure against at least one of said plurality of channels to control flow communication independently to each of the plurality of hollow cells coupled together by the at least one channel.

32. A method in accordance with claim 31 wherein forming a first base layer including a plurality of hollow cells that extend outward from the same base layer and are each coupled together in flow communication further comprises coupling each of the hollow cells together using a plurality of channels arranged in X-shaped patterns that extend between rows of adjacent hollow cells.

33. A method in accordance with claim 31 wherein forming a first base layer including a plurality of hollow cells that extend outward from the same base layer and are each coupled together in flow communication further comprises coupling the plurality of hollow cells together using a plurality of channels arranged in a plurality of X-shaped patterns that extend along a surface of at least one of the first and second layers.

34. A method in accordance with claim 31 wherein coupling each of the hollow cells together using a plurality of channels arranged in X-shaped patterns further comprises injecting a release agent into each channel within the X-shaped patterns.

35. A method in accordance with claim 31 wherein coupling a second layer to the first layer further comprises coupling the second layer to the first layer using at least one of an RF welding process, a lamination process, and an adhesive process.

36. A method in accordance with claim 32 wherein coupling a third layer to at least one of the first layer and the second layer further comprises coupling the third layer to the first layer such that the first layer is between the second and third layers.

37. A method in accordance with claim 31 wherein coupling a third layer to at least one of the first layer and the second layer further comprises coupling the third layer to the second layer such that the second layer is between the first and third layers.

38. A method in accordance with claim 32 wherein coupling a third layer to at least one of the first layer and the second layer further comprises:

inserting the plurality of hollow cells through a plurality of openings formed within the third layer, such that each respective hollow cell extends through a respective third layer opening; and coupling the third layer to the first layer such that the first layer is between the second and third layers.

* * * * *